UNITED STATES PATENT OFFICE.

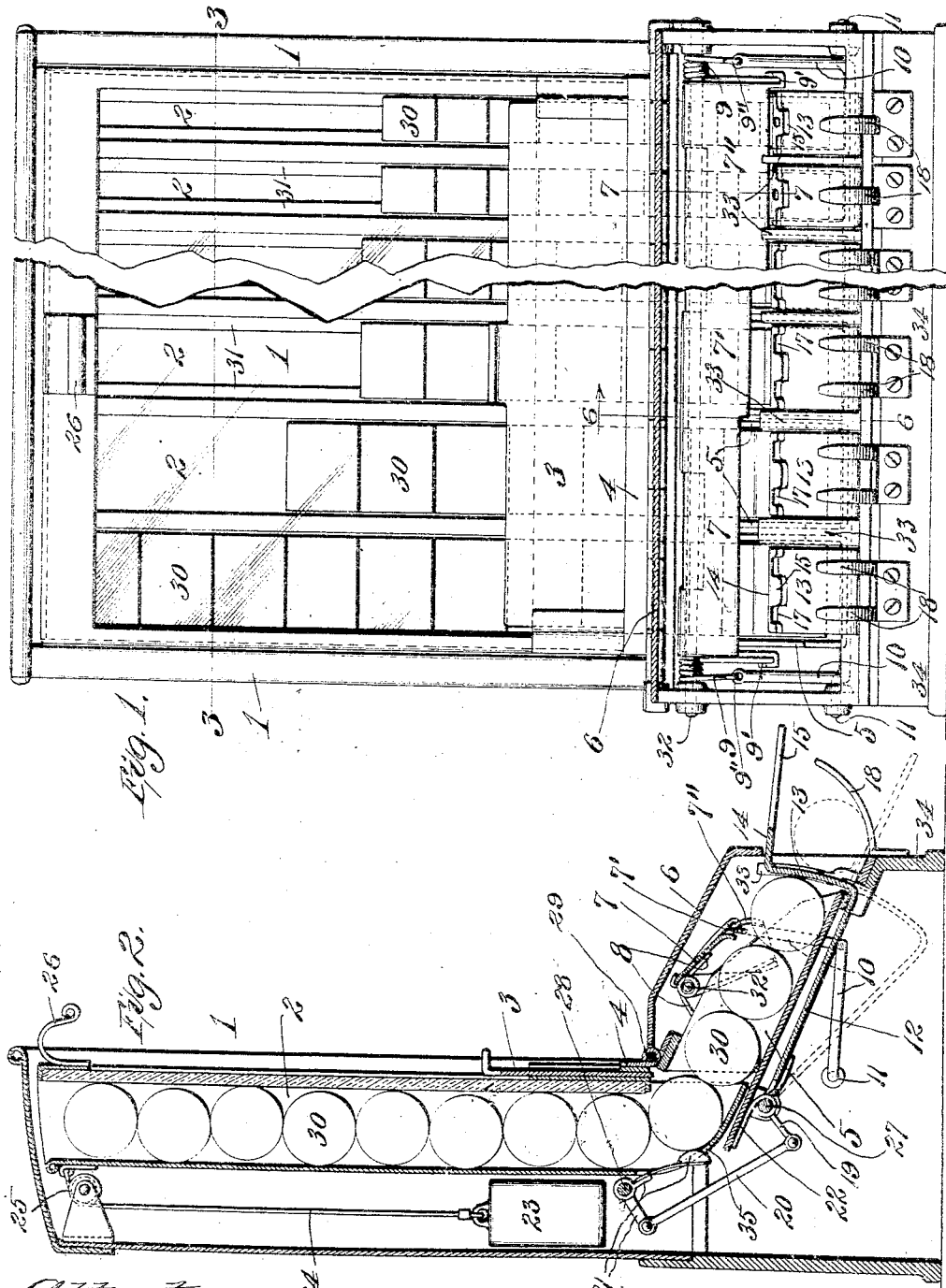

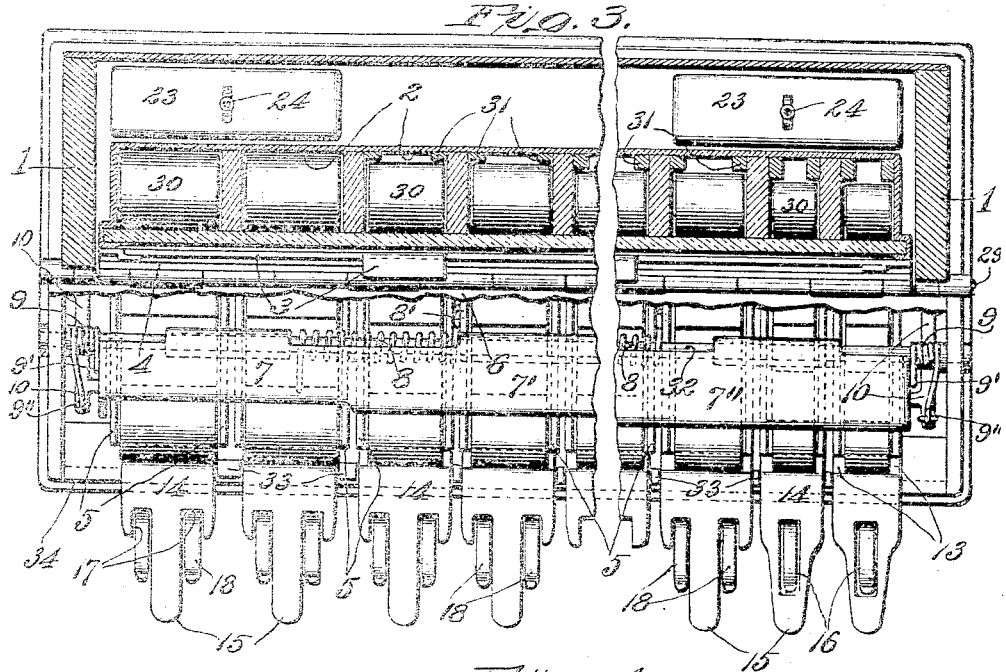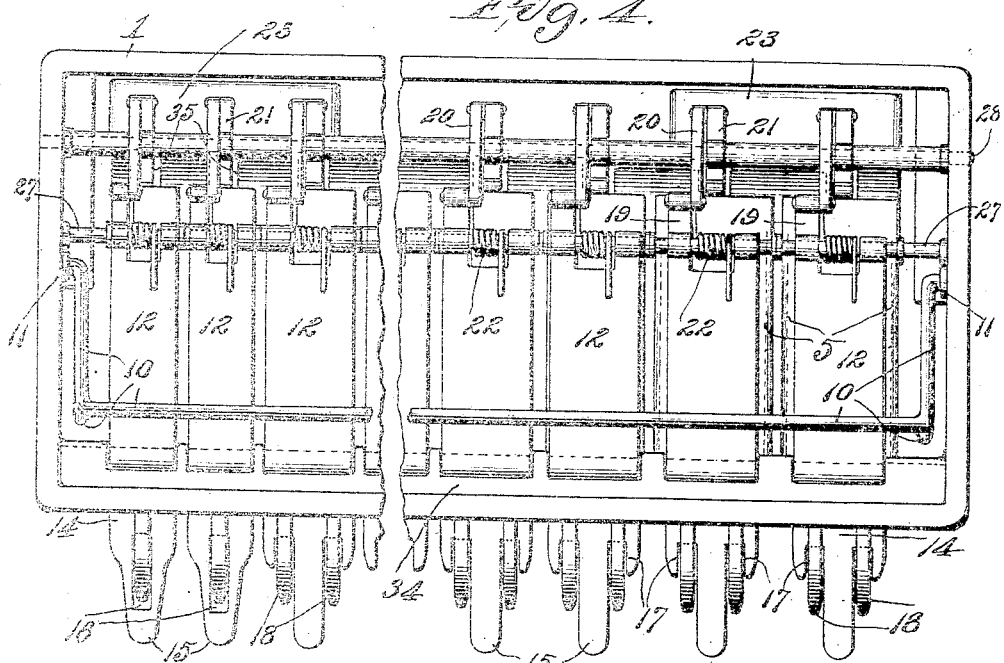

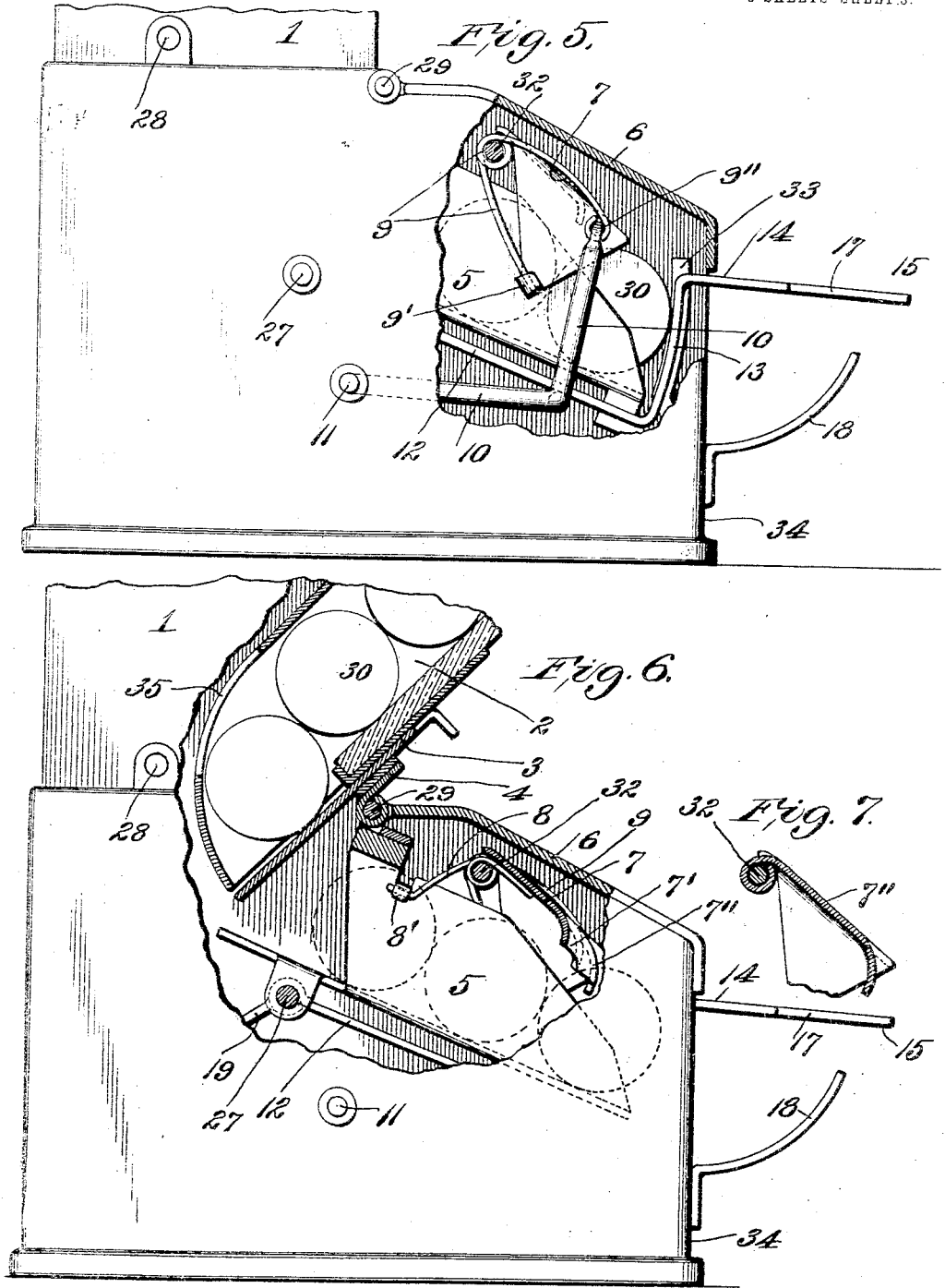

WILLIAM H. OSMER, OF ST. LOUIS, MISSOURI.

DISPENSING-CABINET.

1,113,476.　　　Specification of Letters Patent.　　Patented Oct. 13, 1914.

Application filed January 24, 1914. Serial No. 814,039.

*To all whom it may concern:*

Be it known that I, WILLIAM H. OSMER, a citizen of the United States, residing at St. Louis, in the State of Missouri, have invented a new and useful Dispensing-Cabinet, of which the following is a specification.

My invention relates to dispensing cabinets, for use in stores, salesrooms, &c., for storing, exhibiting and dispensing cylindrical commodities, such as spooled thread, canned goods and other articles put up for sale in cylindrical form, in metal, glass, paper, pasteboard, textile or similar covering.

The objects of my present improvements are, first, to provide a neat, compact, dispensing cabinet, containing one, or a series of chutes, so arranged that the contents, or stock, may be readily placed therein, and advantageously displayed for sale, in a cleanly, attractive condition; second, to provide a cabinet of this character, with means for the convenient discharge and removal of the objects dispensed.

To this end, my invention provides a series of vertical chutes, each terminating at its base, with an inclined delivery end, fitted with a discharge lever conjunctively operating a separating gage, applied, spaced, and adjusted to permit the release and discharge of the contents of each chute in single or other prescribed quantities, and also, means for automatically reversing the discharge lever to its normal position, when released from operative pressure.

To enable others, skilled in the art to which my invention appertains, to make and use the same, I will now proceed to describe its construction and operation, reference being had to the accompanying drawings forming a part of this specification, and in which—

Figure 1, is a front elevation of my improved cabinet; Fig. 2, is a vertical sectional view of the same; Fig. 3 is a horizontal sectional view, taken, approximately, on the line 3—3, of Fig. 1. The cover of the delivery chutes being broken away, exposing the separating gage, its connecting springs, and a portion of the contents of the delivery chutes; Fig. 4, is an inverted or bottom plan view of the cabinet; Fig. 5, is an enlarged side elevation of the lower portion of the cabinet, part of the casing being broken away, and parts being shown in section; Fig. 6, is a view similar to Fig. 5, except that the parts shown in section, are those that would be viewed when the section is taken on the indicating line 6—6, of Fig. 1; Fig. 7, is an enlarged section of the separating gage, taken on the line 7—7, of Fig. 1.

Similar figures of reference indicate similar parts throughout the several views.

1, represents my improved dispensing cabinet, in its general arrangement.

2, are the vertical chutes, which may be constructed either singly, or in a row of two or more. Each chute 2, consisting of an upright compartment, emptying into a slanting, or inclined delivery chute 5, the upright or vertical chute 2, being hinged, as at 4, to the upper inner end of the delivery chute 5. This plan of constructing the chute 2, with the counter-weight 23, cord 24, pulley 25 and hand-hold 26, permits of its being tipped forward far enough to be conveniently filled or loaded, and automatically returned to and held in its normal, upright position in the cabinet. This plan being especially convenient when larger cylindrical articles than spools of thread, are to be placed in the chute 2, such as canned goods, paper or paste-board cylinders containing sugar, coffee, rice and similar commodities.

The lower end of the chute 2, is provided at its front side with a slidable gate 3, shown in an open position, in Fig. 2, and in a closed position, in Fig. 6, the purpose of the gate 3, being to close the outlet of the chute section 2, while it is being filled at the top, to again be opened when ready to discharge its contents. It will be noted that the gate 3, does not control the direct or final discharge of the contents of the cabinet, but serves as a supplemental, intervening gate or check, controlling the feed of the file into the discharge chute, and is operated entirely independent of the discharge lever 12. It may be constructed and applied in the preferred form, as shown, or in any other well known manner.

The chute section 2, may be constructed to carry a single, double or triple file of cylindrical articles, if desired, and it is also, made available for articles uniform, but smaller in dimension, than its largest size capacity, which is accomplished by placing adjustable, longitudinal skids or divisions 31, in the chute section 2, arranged and adjusted to fit it to the file, or files of articles of uniform size, to be carried by it.

The delivery chute, or inclined section 5, and its hinged cover 6, with the preferred plan of their construction, and application for use, will be noted in Figs. 2, 5, and 6.

7, represents the winged or folding, overlapping compression separating gage, hinged along one edge to the shaft 32, upon which shaft, the retaining spring 8, designed to hold the gage 7, in its normal position, is mounted as shown, thus forming a wing connection of the gage 7, to and across the top of the delivery chutes 5. It will be noted, that by a downward sweep of the discharge lever 12, the separating gage 7, performs its function by folding its free edge down in pressure engagement upon the object to be retained in the delivery chute 5, thus separating it from the article preceding it to be discharged when the discharge lever 12, opens the gate 13, to release it.

The advantage of my improved folding compression gage is, that articles in the delivery chute cannot pile up against it, and thus choke or clog the chute, a result incidental to the pressure of articles in a loaded chute, in movement against the right-angle, directly inserted, separating blade commonly used, which, under this condition, is frequently difficult to operate. Hence, by my present improvement, when the discharge lever 12, is released from operative pressure, the gage 7, being of overlapping pressure connection or contact, cannot wedge fast between articles in the delivery chute 5, for by means of the spring 8, the gage 7, is instantly thrown open, and clear of the contents of the chute, and is ready for repeat action, no matter how heavily loaded the delivery chute may be. This is an important factor, especially where cans or heavy cylindrical objects are to be manipulated.

Other features of my separating gage 7, are its economy in construction and range of utility, in that while it may be used in cabinets having a single chute, by longitudinal continuity of the gage, it is made available for a series of parallel delivery chutes 5, across which, it may be extended as shown. In order to properly control, by a continuous separating gage, and separate the different sized articles contained in each chute, of a series of separate chutes, the width of wing, of the gage 7, is widened, or varied to meet these different requirements, as shown by the graduate marks 7' and 7", indicated in Fig. 3.

The check-spring 9, it will be observed by reference to Fig. 5, is an intermediate connecting compression spring, connecting the gage 7, with its operating mechanism, affording means of intervening expansion or contraction of space between the pressure edge of the gage 7, and the discharge lever 12, its object being to afford a wider or additional range of opening sweep for the discharge lever 12, and thus permit ample sweep for the downward stroke of said lever, so that the top of the gate 13, and the receiving apron 14, may be readily brought to a plane of alinement with the discharge end of the delivery chute 5, thus serving as a check against over-straining or bending of that portion of the separating gage 7, brought into direct pressure contact when folded upon the article to be retained by separation in the delivery chute.

The universal trip-rod 10, which is coextensive with the separating gage 7, may be pivoted at the trunnions 11, and connected with the check-spring 9, or, the pivot arms may be omitted, and the trip-rod 10, suspended independently, from the check-spring 9, as may be desired. It will be observed, that by extending the trip-rod 10, below, and under the row, of separate, independent discharge levers 12, means are afforded, whereby each discharge lever 12, independently, operates the universal separating gage 7, in its function of releasing and separating articles for discharge from the cabinet.

12, is the discharge lever, its inner end being pivotally mounted on the shaft 27. In its normal position, it rests against the bottom or base of the delivery chute 5, where it is held in place by the torsion spring 22, its operating sweep, being between the posts 33, on each side of its path at the front of the cabinet with its upward limit gaged by the bottom of the chute against which it rests. In this instance, its free end, at the line of projection beyond the outer end of the delivery chute 5, is turned upward, being thus formed to provide a gate or closure 13, for the outer, or delivery end of the chute section 5; continuing its outward projection, at right angle from the gate 13, the receiving apron 14, is formed, terminating with a finger-plate 15. The discharge lever 12, comprising the gate 13, receiving apron 14, and finger plate 15, varies in width, to correspond with that of the chute it is to serve. In addition to the object of gaging the upward sweep of the discharge lever 12, the plan of its body portion underlapping the delivery chute 5, saves room or space in the cabinet, formerly required at the sides of or between delivery chutes, which is an essential feature where a plurality of chutes are effected. The narrow discharge levers 12, have an elongated slot 16, through the receiving apron 14, while the wider ones have, instead, a recess 17, at each side of the finger-plate 15, so arranged as to register with the stop-posts 18, projecting upwardly from the base-plate 34, and sufficiently extended through said apertures 16 and 17, to stop, and retain the released article, discharged from the cabinet by depression of the discharge lever 12, until removed.

At the inner end of the discharge lever 12, the shank 19, is formed, by means of which, the bar 20, connects it with the bell-crank 21, mounted on the shaft 26. The free end of the bell-crank 21, forms a jack, which swings forward through the aperture, or slotted opening 35, in the lower end of the back of the chute section 2, as the discharge lever 12, closes, thus shifting the contents 30, forward to prevent the chute sections 2, and 6, clogging at the joint.

It is to be understood, that in the construction of my improved cabinet, modifications which constitute mechanical equivalents, may be adopted without departing from the spirit of my invention.

Having thus described my invention, what I claim, and desire to secure by Letters Patent of the United States, is—

1. In a dispensing cabinet, a row of chutes spanned near their delivery end by a continuous, hinged, folding compression separating gage, adapted to fold down upon, engage and separate articles arranged to be discharged from said chutes.

2. In a dispensing cabinet, a row of chutes spanned near their delivery end by a continuous, hinged, folding compression separating gage graduated to fold down upon, engage and separate articles of different size arranged to be discharged from its separate chutes, each of which, independently, carries articles of a uniform size.

3. In a dispensing cabinet, one or more chutes spanned near the delivery end by a hinged, folding compression separating gage, a trip-rod connected with the gage and suspended below said chutes parallel and coextensive with said gage, so connected with the gage as to actuate it in separating articles being discharged from said chutes.

4. In a dispensing cabinet, one or more delivery chutes projecting at right angles between a hinged folding compression separating gage and a suspended parallel trip-rod so connected with said gage at each end thereof as to actuate the same in separating articles being discharged from said chutes.

5. In a delivery chute for dispensing cabinets, a hinged, folding compression separating gage actuated by a sweep-stroke discharge lever pivoted at its inner end and projecting between the bottom of said chute and a suspended continuous trip-rod connected at its ends with said gage, said gage and lever acting in conjunction with said trip-rod to separate the articles in the delivery chute and retain the contents thereof following the article being discharged from said chute.

6. In a dispensing cabinet, a hinged, folding compression separating gage spanning one or more delivery chutes, each chute having a separate individual discharge lever its inner end pivotally secured within the cabinet its free outer end projecting between the bottom of said chute and a suspended universal trip-rod parallel with said gage and connected thereto at its outer ends, said trip-rod and gage being actuated by the individual discharge lever governing the discharge chute independently served thereby, substantially as shown.

7. In a dispensing cabinet, one or more delivery chutes projecting between a hinged folding compression separating gage and a suspended trip-rod parallel with said gage, said gage and trip-rod connected at their ends by a mechanism affording a yielding reciprocating expansion and contraction of space between the said connected parts and a discharge lever projecting and operating between the bottom of said chute and trip-rod.

8. In a dispensing cabinet having one or more delivery chutes, a discharging mechanism comprising a separating gage, a discharge lever and a check-spring, connected with said gage and actuated by said lever to afford a yielding reciprocating expansion and contraction of space between said gage and lever, secured, applied and operating substantially as set forth and described.

9. In a dispensing cabinet having one or more delivery chutes, a discharging mechanism comprising a separating gage, a discharge lever, a suspended trip-rod parallel with said gage, and a check-spring, connecting said gage and trip-rod actuated by said lever to afford a yielding reciprocating expansion and contraction of space applied and operating between said gage and lever, substantially as set forth.

10. In a dispensing cabinet having one or more delivery chutes, a discharging mechanism comprising a folding compression separating gage, a pivoted discharge lever and a check-spring, connected with said gage and actuated by said lever to afford a yielding expansion and contraction of space between said gage and lever, secured, applied and operating substantially as set forth.

11. In a dispensing cabinet having one or more delivery chutes, a discharging mechanism comprising a hinged folding compression separating gage, a suspended trip-rod parallel with said gage, a discharge lever projecting at right angles between said gage and trip-rod and a check-spring, connecting said gage and trip-rod, actuated by said lever to afford a reciprocating expansion and contraction of space between said gage and trip-rod, substantially as set forth.

12. In a dispensing cabinet having one or more delivery chutes and a folding compression separating gage operated by a discharge lever, a vertical guide-post secured at its base to the cabinet upon each side of said discharge lever where it projects from the cabinet at the end of the chute, of a length and curve coextensive with the sweep of said lever, substantially as set forth.

13. In a delivery chute for dispensing cabinets, a discharge lever, its inner end pivotally sceecured to its body portion extending below said chute normally resting against the outer end thereof gaging its upward sweep continuing and shaped at right-angles from the outer end of said chute forming a gate or closure therefor the free end continuing and turned outwardly from the top of the gate forming a receiving-apron and finger-plate said apron having one or more apertures adapted to register therein in the open sweep of said lever, an upwardly projecting retaining post secured to the base of the cabinet and suitably shaped to retain articles discharged therefrom.

14. In a dispensing cabinet having one or more delivery chutes and a controlling discharge lever for each chute pivotally secured at its inner end and terminating at its outer end in an apertured receiving-apron and finger-plate, a suitably shaped retaining post secured to the cabinet below the discharge lever extending upwardly and registering through its corresponding apertures in the receiving-apron sufficiently to retain articles discharged from the cabinet while the lever and gate are in open position.

WILLIAM H. OSMER.

Witnesses:
JOHN O. WILSON,
JOHN Y. COFFMAN.